INVENTORS
ALBERT J. ROMEO
ERNESTO G. SEVILLA
TORKJELL SEKSE

BY
AGENT

United States Patent Office 3,291,994

Patented Dec. 13, 1966

3,291,994

SPROCKET SIGNAL GENERATOR WITH NOVEL APERTURE ARRANGEMENT FOR PRECISE TIMING OF SIGNALS

Albert J. Romeo, Springfield, and Torkjell Sekse and Ernesto G. Sevilla, Norristown, Pa., assignors to Sperry Rand Corporation, New York, N.Y., a corporation of Delaware Filed Nov. 16, 1964, Ser. No. 411,497
5 Claims. (Cl. 250—219)

The invention hereinafter described and claimed has to do with position monitoring systems and devices, but more particularly to timing signal generators. With still more particularity, however, the invention relates to means for generating sprocket signals for monitoring the timing of the operation of associated equipment, such as paper tape readers, as described below in accordance with the preferred embodiment.

In our present complex world of automation the precise timing of the operation of system components has become increasingly important. Known timing devices or systems are adequate for equipment where operating speed does not require exact timing. Where speed is required very often, however, they fall short of providing the necessary signals at the precise critical moment.

In paper tape readers, for example, the known devices are too sensitive to tape speed and signal amplitude. Then too, it is difficult, if not impossible, in start and stop operations to stop the tape without losing signals.

The present invention has as its primary object to provide a monitoring device for generating timing signals on a precise schedule.

It is also an object of the invention to provide a signal generator particularly useful in precisely timing the operation of intermittently operable equipment.

Another object is to provide means for generating precisely timed sprocket signals.

Still another object is to provide such a sprocket signal generator which is insensitive to tape speed or signal amplitude.

A further and more specific object is to provide a sprocket signal generator for paper tape readers which permits a wide tape stopping tolerance whereby signals are not inadvertently produced or lost.

In accordance with the above objects and first briefly described, the invention comprises a position monitoring signal generating device for producing individual sprocket signals only in response to at least two sequentially detected tape sprocket signals having coincident portions.

Figure 1:
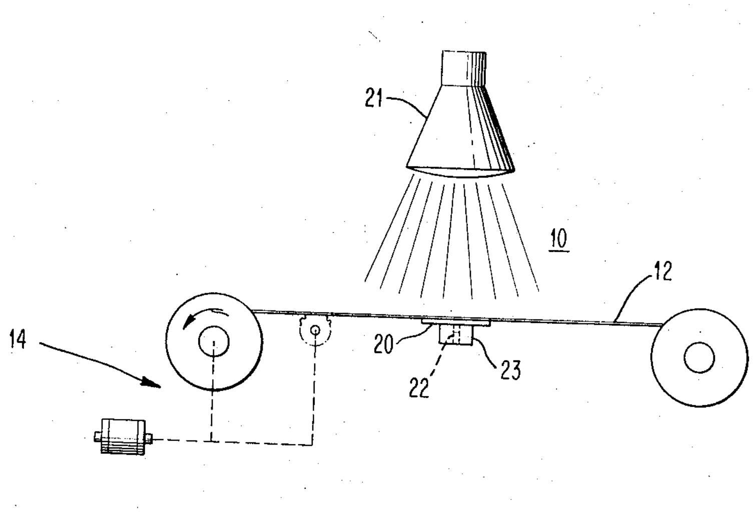
FIGURE 1 is a schematic view of a tape reading station embodying the invention.
Figure 2:
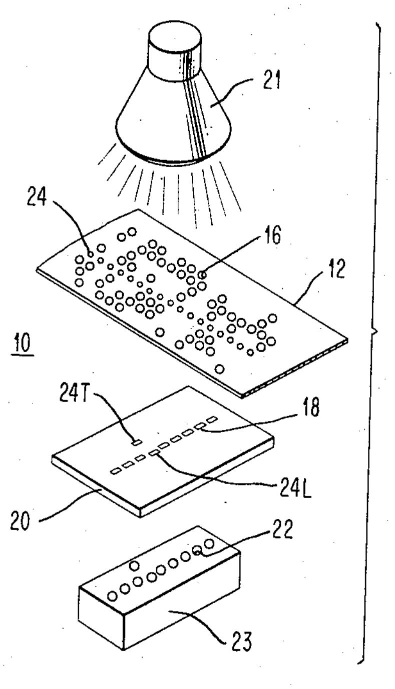
FIGURE 2 is an exploded view of the reading head at the reading station.

With reference now to the details of the drawings and first to FIGURES 1 and 2, it will be seen that this preferred embodiment of the invention comprises a reading station 10 through which punched paper tape 12 is moved by suitable tape moving and take-up means diagrammatically shown at 14. As the tape moves continuously through the station, information or data holes 16 in the tape are presented in registration with the aligned reading apertures 18 in the head plate 20.

The plate preferably is formed of a clear substance, such as glass, coated with an opaque material except where the apertures appear. Light from source 21 passes through the registered holes in the tape and the apertures of the plate 20 to impinge upon photo-cells 22 thus to generate output signals for use in actuating associated equipment, such as a printer for printing out the information represented by the data holes. The photo-cells may be potted as a unit 23 for convenience.

The reading apertures 18 are aligned across the head plate 20 transverse to tape movement, with three on one side and five on the other side of a pair of sprocket apertures 24L and 24T aligned at 90° to the reading apertures. These two sprocket apertures are the heart and pulse of applicant's invention. It is through them that the two sequentially produced coincident signals are generated.

The leading sprocket aperture 24L is slightly offset to the right of apertures 18, as seen in FIGURE 2. Its mate, trailing sprocket aperture 24T, is offset from the other side of aperture 18 by a greater distance. In practicing this embodiment of the invention, the two sprocket apertures are separated from each other slightly more than one sprocket pitch, the reason for which will be described below. Considering, by way of example, a sprocket pitch 0.1″ for the tape sprocket holes, sprocket apertures 24L and 24T would be spaced on 0.122″ centers.

Tape sprocket holes conventionally have been utilized to trigger tape reading means when proper registration of the tape holes is attained. In the prior art, where single sprocket holes are used for this purpose, the system is sensitive to the amplitude of the light signal when the tape is started. In addition the tapes of the prior art had to be stopped in the webbing between the sprocket holes and when the length of this webbing approaches the diameter of the sprocket holes the mechanical tolerances of the tape transport device become critical.

Applicant's invention overcomes these disadvantages, making it possible to drive the tape continuously at greatly increased speed, and when desired, to stop and restart the tape without losing or producing unwanted signals.

Figure 3:
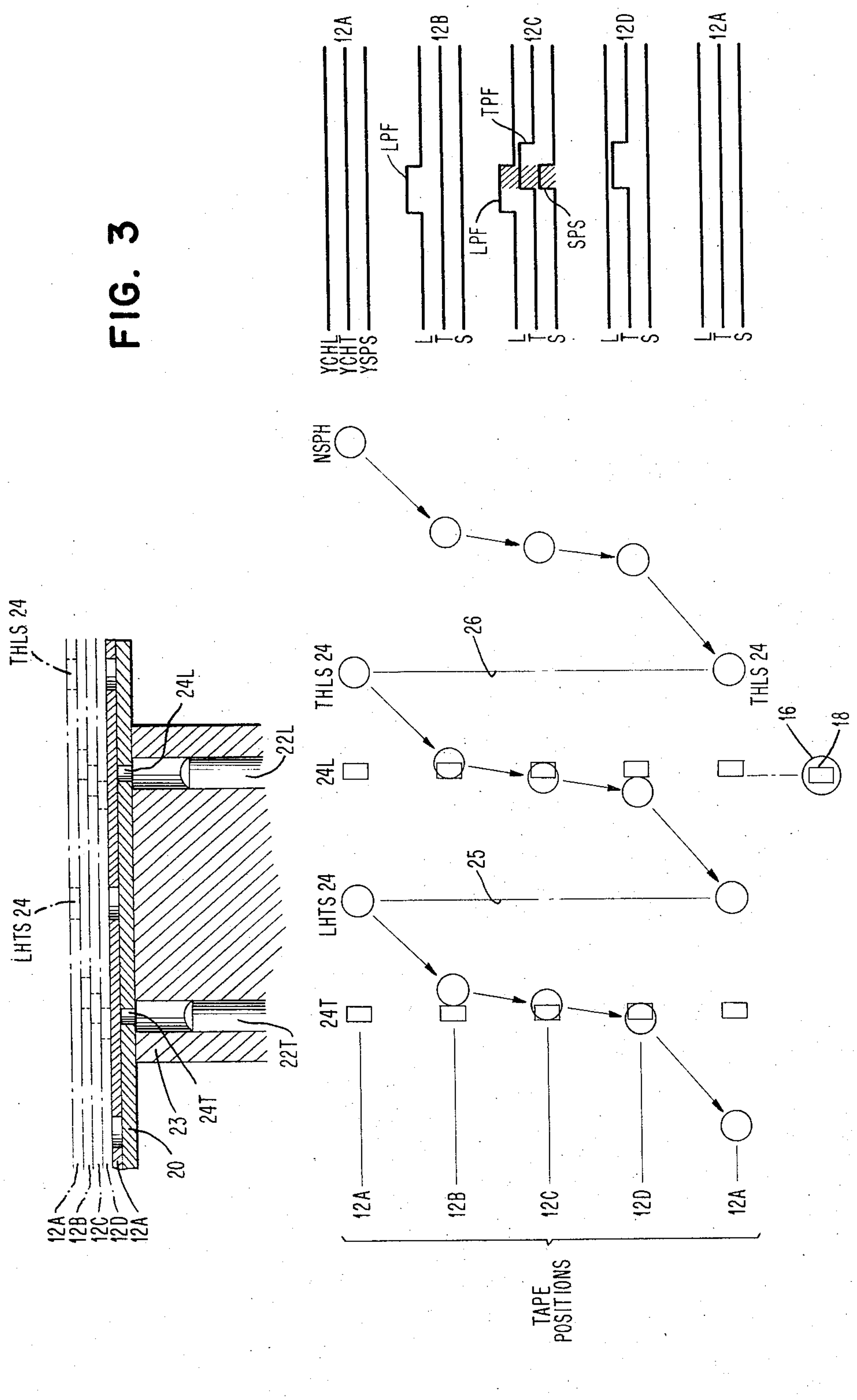
FIGURE 3 is a diagrammatic view illustrating signal conditions at selected sequential time phases during operation of the system.

FIGURE 3 illustrates diagrammatically how applicant's invention generates the two sequentially and coincident sprocket signals necessary to produce a single timing sprocket signal for triggering operation of the tape reading means. How the two signals are used to produce the single sprocket signal is shown in the block diagram of FIGURE 4, to be described later.

At the top of FIGURE 3 the reading station 10 is shown schematically in section through the spaced sprocket apertures 24L and 24T.

It will be understood that the tape normally passes over plate 20 in close contact with its upper surface, as shown by the cross-sectioned layer 12A. The broken line webs 12A, 12B, 12C and 12D, show the progression of the tape as it moves to the left across the read head. Corresponding positions 12A–12D are projected in plan view below the read head with signal conditions indicated along the right side of the figure by the three lines, identified at position 12A as YCHL, YCHT and YSPS, and shortened to L, T, and S in the others. In this designation: Y=punched tape; CH=channel; L=leading; T=trailing; SP=sprocket; and S=signal.

In the top broken line tape position 12A, it is seen that the leading sprocket hole LHTS 24 (short for leading hole, trailing signal) and the trailing sprocket hole THLS 24 (short for trailing hole, leading signal) are approaching positions over photo-cell apertures 24T and 24L respectively, but neither is yet registered with them. Straight lines YCHL and YCHT on the right represent this condition.

When the tape reaches position 12B the left half of data hole THLS 24 is registered over aperture 24L, to produce a first or leading output signal as a result of light from source 21 impinging upon photo-cell 22L, the condition being indicated by the pulse form LPF on line L. During movement of the tape to the next illustrated time phase, indicated as tape position 12C, hole THLS 24 has moved partially across aperture 24L leaving its right half registered with the aperture. Simultaneously the leading half of hole LHTS 24 moves into registry with aperture 24T, to produce an output signal as a result of light from source 21 impinging upon photo-cell 22T at a time trailing the LPF pulse but, as indicated by the pulse form TPF on line T (position 12C) with its leading portion coincident with the trailing portion of LPF. At the time of the coincidence of these two signals the data holes, as shown at 16 at the bottom of the figure, are precisely registered with apertures 18 in the read head plate 20. The coincidence of these two signals (LPF and TPF) produces the one sprocket signal indicated by the pulse form SPS, and in the manner described below.

Position 12D shows a succeeding time phase wherein hole LHTS 24 is still over aperture 24T but hole THLS 24 has moved completely off of aperture 24L and is moving toward the leading hole position, as indicated by line 25 to become identified as hole LHTS 24 to begin a new cycle for reading the next row of data holes aligned with the next sprocket hole NSPH. At line 26, hole NSPH, short for next sprocket hole, becomes identified as hole THLS 24 in the next cycle which is a repeat of that described above.

Figures 4, 5:
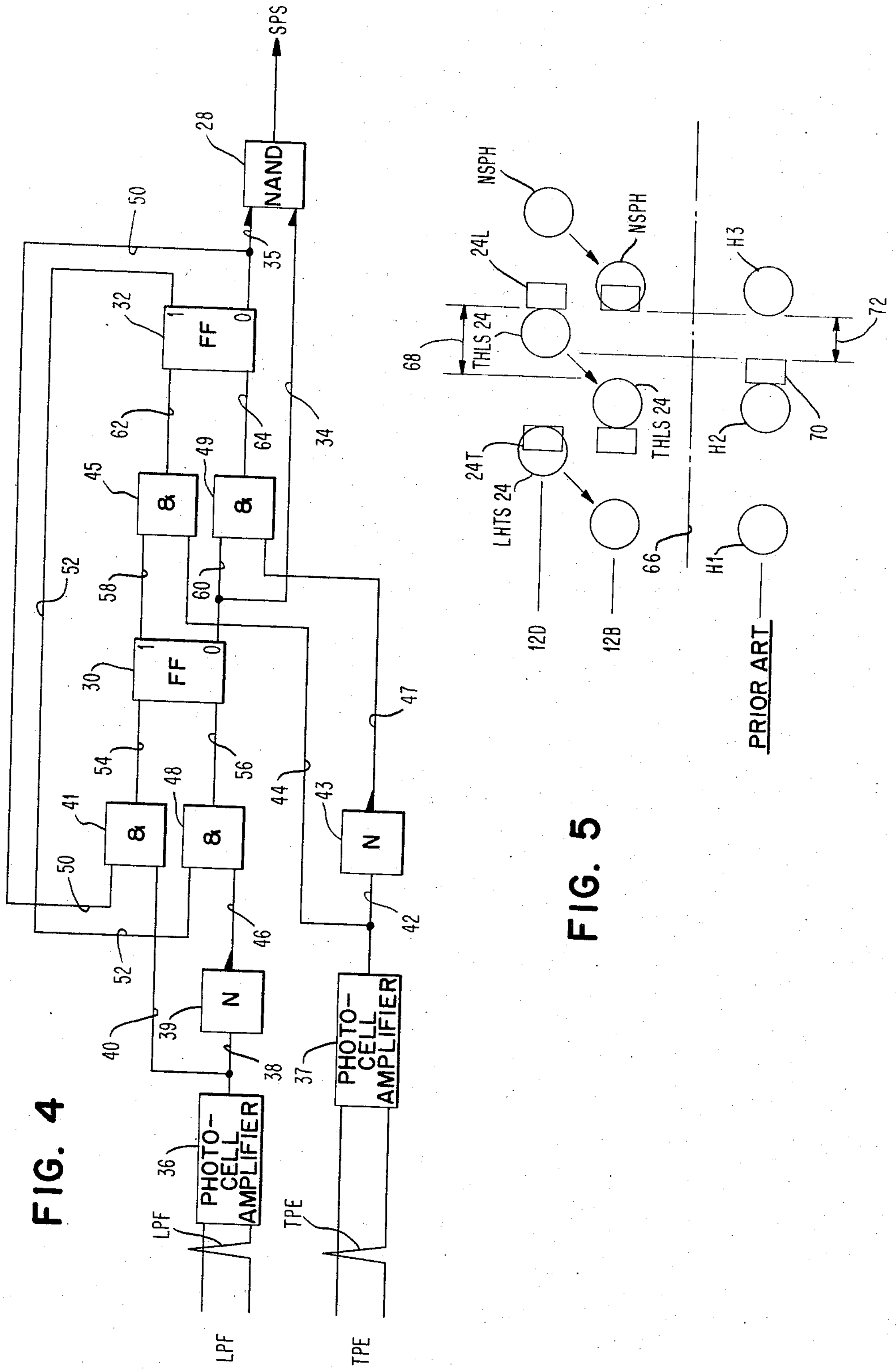
FIGURE 4 is a logic diagram of a circuit for generating individual sprocket signals in response to coincidence of two sequentially produced signals.
FIGURE 5 is a diagrammatic view comparing applicant's invention with prior art.

How the coincidence of two signals LPF and TPF (position 12C) produces only one usable sprocket signal SPS will now be explained with reference to FIGURE 4. In this figure, the single timing sprocket signal SPS is designated at the extreme right hand side as the inverted output from an NAND gate 28. It wil be noted that NAND gate 28 is completely conditioned to conduct only by coincident high signals from two signal detecting and storing devices, such as flip-flops 30 and 32, by way of conductors 34 and 35 respectively.

As shown at the extreme left of this figure, signals LPF and TPF are fed into photo-cell amplifiers (PCA's) 36 and 37 respectively. The output of PCA 36 is over wire 38 to an inverter 39, and wire 40 to AND gate 41. The output of PCA 37 is over wire 42 to inverter 43, and wire 44 to AND gate 45. The output signals from inverters 39 and 43 are transmitted over wires 46 and 47 to AND gates 48 and 49, respectively. Second inputs into gates 41 and 48 are respectively from the ZERO and ONE outputs of flip-flop 32 over wires 50 and 52. The output signals from gates 41 and 43 are transmitted over wires 54 and 56 to transfer flip-flop 30 respectively to its ONE and ZERO sides. The output signals from flip-flop 30 are fed over wires 58 and 60 into AND gates 45 and 49, all respectively. Inputs to the ONE and ZERO sides of flip-flop 32 are applied over wires 62 and 64 from gates 45 and 49.

It should be understood that both flip-flops must be conducting in their ONE states to produce the high signals from their respective ZERO sides for conditioning NAND gate 28 to produce the timing sprocket signal SPS.

When first turned "on" the circuit might be in one of several conditions. For example, each of the flip-flops may be in its "set" or ONE condition requiring resetting. However, this is of no concern because automatic reset is a built-in feature of the circuit.

Assume that there are no light conditions seen by the photo-cells when the system is first turned "on." With both flip-flops in this "set" condition, the photo-cell amplifier 36 will send a high signal over wire 38 to be inverted at inverter 39 to forward a low signal to gate 48 via wire 46. Since flip-flop 32 is conducting on its ONE side, gate 48 also receives a low signal from the ONE side of flip-flop 32 over wire 52 thus to condition this gate to send a low signal via wire 56 to the ZERO side of flip-flop 30 causing it to reset. The ZERO side of flip-flop 30 feeds a low signal to gate 49 over wire 60. The other low signal needed to enable gate 49 to feed a reset low signal to flip-flop 32 by way of wire 64, is obtained over wire 47 from inverter 43 which received a high signal over wire 42 from photo-cell amplifier 37. Hence flip-flop 32 is also reset to its ZERO side. The system will handle other initial turn on conditions in a fashion which will provide the proper operating condition for signals being transmitted to 36 and 37.

With the flip-flops 30 and 32 reset, consider the operation with the tape feeding through the reading station, as described above. When the hole THLS 24 (FIGURE 4) registers with photo-cell aperture 24L (position 12B) the leading signal LPF is generated. Following the route of this leading signal LPF (which is a low signal) on the block diagram of FIGURE 4, it is seen that it is first routed to the photo-cell amplifier 36 to produce an output signal which is fed over wire 40 to the input of gate 41. The other low signal to fully condition gate 41 is received from the ZERO side of flip-flop 32 via wire 50. The resultant low output signal from gate 41 is passed via wire 54 to cause flip-flop 30 to flip to its set or ONE state and pass on a low signal to gate 45 over wire 58, whose other input is, for the moment, a high signal from photo-cell amplifier 37.

As tape 12 continues to move, the position shown at 12C is reached and low signal TPF is produced in time for coincidence with signal LPF. This new signal is amlified by the amplifier 37 to produce a low output signal which is fed to gate 45 over wire 44 to cooperate with the low signal from flip-flop 30 to fully condition this gate. In response to the last mentioned low signals, the AND gate 45 sends a low signal over wire 62 to cause flip-flop 32 to flip to its set or ONE state.

With both flip-flops in the ONE state their ZERO sides are conditioned to forward high signals over wires 34 and 35 respectively to AND gate inverter 28 whose output is the single low timing sprocket signal SPS.

When the tape moves to the position identified as 12A in FIGURE 3, both flip-flops will reset as described above, thus completing a signal producing cycle which will be repeated over and over as successive pairs of sprocket holes pass over sprocket apertures 24L and 24T.

As mentioned above a feature of the invention is its wide tape stopping tolerance.

Generation of successive sprocket signals with successive single sprocket holes, as in the prior art, leaves only two thirds of the width of the web between sprocket holes in which to stop the tape without generating an unwanted signal. When it is realized that the normal web between sprocket holes is equal to only about one and a half hole diameters, it can be understood that not much stopping distance between holes is available.

With the present invention, stopping tolerance is substantially increased over the single hole method. To illustrate, reference may be had to FIGURE 5.

In this figure, that portion above line 66 diagrammatically illustrates two tape positions substantially corresponding to positions 12D and 12B respectively, in FIGURE 3. Here it is seen that sprocket hole THLS 24 has just cleared aperture 24L—position 12D—causing flip-flop 30—as described above—to flip to its ZERO side and kill the sprocket signal SPS. As the tape continues to move, hole NSPH moves over aperture 24L, as seen at position 12B, while hole THLS 24 has just reached aperture 24T. The distance that hole THLS 24 has moved—between positions 12D and 12B—as indicated by the arrow 68 at the top of this figure, is the total stopping tolerance afforded by the present invention. By way of comparison assume that this distance has a value of three.

When only one hole is used, as diagrammatically illustrated below line 66, the stopping tolerance has a value of only two. To illustrate, FIGURE 5 shows that hole H2 has just cleared aperture 70 to kill the sprocket signal. At this moment the distance between the leading edge of the succeeding hole H3 and the trailing edge of aperture 70, as indicated by the arrow 72, is the total available stopping distance before another signal is generated. Measurement will show this distance to be only two thirds that of applicants' stopping tolerance. Thus it is seen that applicants' invention affords about a thirty-three percent increase in stopping tolerance.

With the use of two sprocket holes whereby each is effective to condition a flip-flop, as described above, the system is rendered insensitive to signal amplitude which is particularly important upon a start operation. When only one hole is used, quite frequently when starting operation, the first hole may be adjacent to and does not pass over the reading aperture fast enough to avoid the generation of one or more spurious signals.

By way of explanation, assume that the leading edge of a hole is overlapping the reading aperture when the equipment is turned on. In this case, the photo-cell sees light but it may not be quite at the firing threshold of the associated amplifier. However, a fluctuating noise level may be of sufficient amplitude and frequency to cause the amplifier to conduct several times before the signal reaches its true firing level. The resultant effect is multiple readings of the same data holes.

Applicants' use of two holes and two signal detecting and storing devices, such as the flip-flops, prevents this condition. It matters not how long either or both of the holes is over, or how slowly they might be moved over the read apertures, all either can do is to condition its associated flip-flop. And, as described above, both flip-flops must be set before a sprocket signal is produced.

From the above it is now evident that applicants' invention provides a position monitoring system particularly useful in the accurate and timely reading of punched holes in a continuous web or tape. The system produces precisely timed sprocket signals which are insensitive to signal amplitudes, and provides wide stopping tolerance between stop and go signals.

The embodiments of the invention in which an exclusive property or privilege is claimed are defined as follows:

1. A sprocket signal generator to be used with a record medium having sprocket holes therein comprising: a reading station; first means in said reading station for generating a first sprocket signal in response to a first sprocket hole in a record medium passing through said reading station; second means in said reading station for generating a second sprocket signal in response to a second and sequentially positioned sprocket hole in said record medium; said first and second signals having partially coincident portions; and means responsive only to said coincident portions of said first and second signals for producing a single sprocket pulse.

2. A sprocket signal generator according to claim 1, wherein said first and second signal generating means comprises: a read head having a pair of sprocket apertures aligned in the direction of feed of a record medium passing through said reading station, and spaced apart a distance equal to slightly more than one sprocket hole pitch; a source of light on one side of said read head; and photo-cell means positioned on the other side of said read head in registry with each of said sprocket apertures; whereby said first signal is produced by registry of the trailing hole of a pair of holes with one of said apertures, and the second later signal is produced by registry of the leading hole of said pair of holes, and is coincident with a portion of said first produced signal.

3. A sprocket signal generator according to claim 2, wherein: said means for producing a single sprocket signal only in response to said first and second signals, comprises: a pair of signal detecting and storing devices, one of which is set by said first sprocket signal and the second of which is subsequently set by said second sprocket signal; and gate means responsive only to simultaneous signals from both of the signal detecting and storing means to produce said single sprocket signal.

4. A sprocket signal generator for timing the reading of data holes in punched tape, or the like having aligned sprocket holes comprising: a reading station comprising a read head plate having a row of data reading apertures aligned across said plate transverse to the direction of tape feed; a pair of sprocket apertures consisting of leading and trailing apertures aligned transverse to said data reading apertures and separated from each other by slightly more than one tape sprocket hole pitch, the leading aperture of said pair being only slightly out of alignment on the leading side with said data reading apertures; light responsive means positioned on one side of said read head plate in registry with each of said data reading apertures and said pair of sprocket apertures; a source of light positioned to direct its light rays through all of said apertures; means for moving tape across said read head whereby each of successive pairs of sprocket holes are moved successively into registry with said sprocket apertures, the trailing hole first in registry with the leading sprocket aperture and the leading hole subsequently in registry with the trailing sprocket aperture, thus successively to cause said light responsive means to generate pairs of sequentially produced sprocket signals with coincident portions; and means for utilizing said pairs of coincident signals to produce a single sprocket signal for triggering reading of data holes in said tape.

5. A sprocket signal generator according to claim 4 wherein said last mentioned means comprises: a pair of flip-flops; means for utilizing said pair of sprocket signals successively to move said flip-flops to their set condition whereby simultaneous signals are conducted to an AND gate to produce the single sprocket signal; and means responsive to cut-off of said signals to reset said flip-flops.

References Cited by the Examiner

UNITED STATES PATENTS

| | | | |
|---|---|---|---|
| 3,026,419 | 3/1962 | Aweida et al. | 250—219 |
| 3,122,237 | 2/1964 | Stenstrom | 250—219 |
| 3,222,501 | 12/1965 | Wood | 250—219 |

RALPH G. NILSON, *Primary Examiner.*

M. ABRAMSON, *Assistant Examiner.*